M. HALLANAN.
TIRE.
APPLICATION FILED AUG. 15, 1912.

1,092,353.

Patented Apr. 7, 1914.

Attest:

Michael Hallanan,
Inventor:
by Robt B Kilgore
Atty

UNITED STATES PATENT OFFICE.

MICHAEL HALLANAN, OF NEW YORK, N. Y.

TIRE.

1,092,353.

Specification of Letters Patent. Patented Apr. 7, 1914.

Application filed August 15, 1912. Serial No. 715,205.

*To all whom it may concern:*

Be it known that I, MICHAEL HALLANAN, a citizen of the United States, residing in the city, county, and State of New York, have invented a new and useful Improvement in Tires, of which the following is a specification.

The objects of my improvement are the production of a tire in which punctures and blow-outs will be reduced to a minimum and in which the kneading or flattening strains under load will be taken care of and in which, if an air tube is employed very light pressures can be carried.

Figure 1:
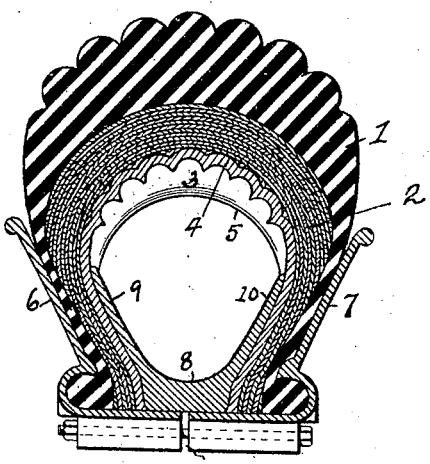
Figure 2:
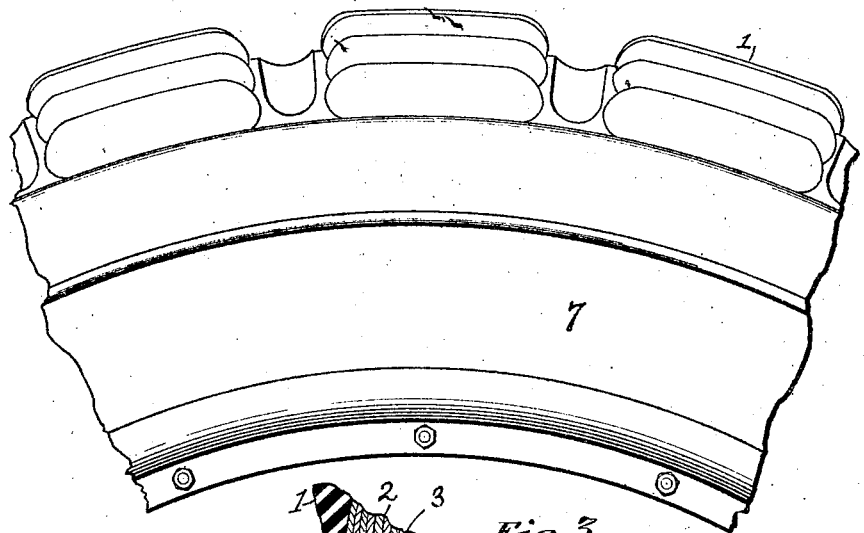

In the drawing Figure 1 is a sectional view of the tire; Fig. 2 a side view and Fig. 3 a view of a modification.

The tire comprises a rubber tread 1 on a canvas carcass 2. Inside the carcass and integral therewith is the sole leather support 3 corrugated longitudinally at 4 under the tread and having the transverse arches 5 at suitable intervals.

The metal rim in which the tire is secured to the wheel has the high side walls or lips 6 and 7 between which the base and lower side walls of the tire are supported. A second metal ring 8, preferably in sections, is provided with lips 9 and 10 and is placed inside the tire so that the side walls are supported between the pairs of lips 6 and 9 and 7 and 10 to prevent undue flattening under load. The sole leather lining 3 stiffens the rubber and canvas and the corrugations 4 and arches 5 serve to further strengthen it against crushing strains. If heavy loads are to be carried the resistance of the tire to crushing is further increased by using an air tube 11 in which a light air pressure is carried. The rim is preferably divided as shown in Fig. 1 and bolted together to facilitate removal of the tire.

Figure 3:
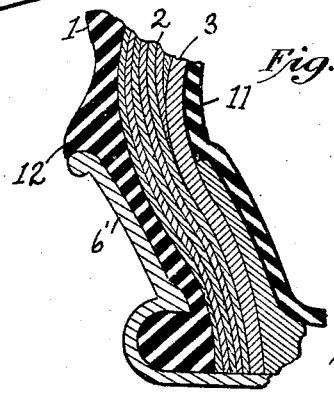

In the modification shown in Fig. 3 the side wall or lip 6' of the rim engages a lip 12 on the side wall of the tire to further support the same.

In practice the tire is made heavy and rigid enough to act as a cushion tire but when an air tube is used the leather lining will prevent punctures and blow-outs.

I claim:—

A tire composed of a rubber tread, a canvas carcass and an inner lining of leather united into an integral structure, the inner leather lining being longitudinally corrugated and provided with transverse arches at suitable intervals.

In testimony whereof I have hereunto subscribed my name in the presence of two attesting witnesses.

MICHAEL HALLANAN.

Witnesses:
ROBT. B. KILLGORE,
D. E. MINTZ.